United States Patent [19]

Horiuchi et al.

[11] Patent Number: 4,935,390

[45] Date of Patent: Jun. 19, 1990

[54] MULLITE-BASED CERAMIC BODY

[75] Inventors: Michio Horiuchi, Koshoku; Kihou Mizushima; Shoichi Iwai, both of Nagano, all of Japan

[73] Assignee: Shinko Electric Industries Co., Ltd., Nagano, Japan

[21] Appl. No.: 199,332

[22] Filed: May 26, 1988

[30] Foreign Application Priority Data

Jun. 4, 1987 [JP] Japan ................................. 62-140444

[51] Int. Cl.$^5$ ............................................. C04B 35/10
[52] U.S. Cl. ................................................... 501/128
[58] Field of Search ........................................ 501/128

[56] References Cited

U.S. PATENT DOCUMENTS 4,587,225 5/1986 Tsukuma et al. .................... 501/128
4,595,665 6/1986 Takayama et al. .................. 501/127

OTHER PUBLICATIONS

K. Hashimoto and K. Niwa, "The Effect of M$_g$O Addition on Mullite Substrate", Yogyo Kyokaishi vol. 95, No. 10, 1987, pp. 1037-1039.

J. S. Moya and M. I. Osendi, Journal of Materials Science Letters 2 (1983), 599-601.

S. M. Johnson and J. A. Pask, Ceramic Bulletin, vol. 61, No. 8, (1982), 838-842.

*Ceramic Industry*, Jan. 1987, pp. 48-49.

*Primary Examiner*—Mark L. Bell
*Assistant Examiner*—David M. Brunsman
*Attorney, Agent, or Firm*—Staas & Halsey

[57] ABSTRACT

A sintered mullite-based body having an excellent dielectric constant and thermal expansion coefficient, and an improved flexural strength and surface smoothness, is obtained by heat treating a composition of 99.1 to 80% by weight of a mullite powder and 0.1 to 20% by weight of yttrium oxide as a sintering agent, optionally together with a colorant of MoO$_3$.

8 Claims, No Drawings

MULLITE-BASED CERAMIC BODY

BACKGROUND OF THE INVENTION

1. Field of the Invention

The present invention relates to a sintered mullite-based ceramic body and a process for manufacturing same. The mullite-based ceramic body is particularly suitable for ceramics used in the electronics field.

2. Description of the Related Art

Due to recent trends toward an increase of the packaging density and a reduction of the production costs of electronics parts, materials of packages and substrates are required to have a lower dielectric constant, a higher thermal conductivity, a higher mechanical strength, and a thermal expansion coefficient close to that of a semiconductor element, and to be able to be manufactured at a lower cost. Further, a highly reliable gas sealing property (hermeticity) is required. In attempts to satisfy these requirements, aluminum nitride ceramics, silicon carbide ceramics, mullite ceramics, and low-temperature-fired ceramics, etc., have been investigated and developed.

Among the above ceramics, aluminum nitride ceramics and silicon carbide ceramics have thermal conductivities, thermal expansion coefficients and mechanical strengths superior to those of the alumina ceramics now widely used in the electronics field, but have higher dielectric constants, and thus disadvantageously lower the operation speed of high speed integrated circuits.

Low-temperature-fired ceramics comprising ceramics and glass, i.e., glass ceramics, have a thermal expansion coefficient matching that of thus, so that heat stress between a semiconductor element and a substrate is reduced, and they can be designed to have a dielectric constant as low as 3 to 7. However, the low-temperature-fired ceramics disadvantageously have a low thermal conductivity remarkably lower than that of alumina ceramics, and thus have a low cooling effect.

These ceramics can be used in combination with metals having a low electrical resistance, such as silver and gold. HOwever, these metals cause problems in that, for example, silver brings on the problem of electromigration, restricting the applications thereof, and gold is very expensive. Further, materials that can be soldered to these metals at a temperature lower than that used for firing these ceramics are restricted.

On the other hand, mullite ceramics have a low dielectric constant and a low thermal expansion coefficient on a par with those of low-temperature-fired ceramics, and have a high thermal conductivity superior to that of low-temperature-fired ceramics. Also, mullite ceramics have an advantage in that metallization, the soldering of outer leads, and the formation of electrical resistance elements by post firing can be reliably conducted by conventional processes used for alumina ceramics.

A sintered mullite body is conventionally produced by firing, at about 1600° C., a mixed powder of alumina ($Al_2O_3$) and silica ($SiO_2$), which are the constituents components of mullite. However, the resulting sintered body has a low mullite yield, and thus, the mechanical strength and humidity resistance of the body are low. To increase the mullite yield, kaolin or Mokusetsu clay (which is similar to Ball clay) are incorporated into the starting material of a mixture of alumina and silica. But, in the cases, these clay minerals emit a high amount of α-rays, which inhibits the use of the sintered body as a semiconductor device packaging material. These old-type mullites have been used as a raw material for refractories, and in this case, a certain amount of sodium oxides in the body is required to obtain a high creep resistance of the refractories. Nevertheless, these alkaline earth impurities, such as sodium oxides, must be eliminated to satisfy the above electric requirements.

On the other hand, mullite powders produced by an electrofusion method, etc., produce a high mullite yield in a sintered body, which is therefore useful as packaging material for electronic parts or substrates of semiconductor elements. The green body consisting of these mullite powders generally cannot be sufficiently densified by firing at a temperature lower than 1600° C. A sintered body manufactured from a mixture of such electrofused mullite powders and an alkali earth metal oxide as a sintering agent is known. However, the obtained sintered body does not have sufficient mechanical strength, and other problems often arise if an electrical resistance element is formed on the body. In the latter case, these problems include a deterioration of the resistance characteristics and an adhesion to the body, of the electrical resistance element. A sintered body manufactured from a mixture of the above mullite powders and an alkali earth metal and zirconia is also known. This sintered body has a high mechanical strength, but emits α-rays due to the zirconia content, which may cause errors during the operation of semiconductor elements.

As another body having a high mechanical strength, a pure mullite ceramic is already known as a structural ceramic. This sintered body is obtained only by firing at a temperature higher than 1650° C. Additionally, this sintered body does not include a glassy phase, and thus does not permit an adequate adhesion strength of co-fired conductors when formed on the surface thereof.

Sometimes the packaging material for semiconductor devices is required to have a light-shielding property, to prevent operation errors of a semiconductor element due to entrance of light in the low wavelength range, including ultraviolet rays. Note, all of the above mullite ceramics are white and have a poor light-shielding property.

SUMMARY OF THE INVENTION

The object of the present invention is to solve the above problems of the prior art and to provide a sintered mullite-based ceramics body having an improved density and mechanical strength without loss of the inherent excellent properties thereof, including a low dielectric constant.

The above and other objects of the present invention are attained by providing a sintered mullite-based ceramic body obtained from a composition comprising 80.0 to 99.9% by weight of a mullite powder and 0.1 to 20% by weight of yttrium oxide.

The process for manufacturing the sintered mullite-based ceramic body comprises: preparing a composition of 80 to 99.9% by weight of a mullite powder, 0.1 to 20% by weight of yttrium oxide, and an organic binder, the total of the mullite powder and the yttrium oxide being 100% by weight; forming the composition into a body; subjecting the body to a first heat treatment to remove the organic binder from the body; and subjecting the body to a second heat treatment at a temperature of 1300° C. to 1850° C., to sinter the body.

In a preferred embodiment, a metal paste of, e.g., tungsten or molybdenum-manganese is applied to the body formed from the above composition, which is then heat treated at a temperature of 1500° C. to 1600° C. to obtain a sintered mullite-based ceramic body with a metallized layer. The conditions for the heat treatment may be the same as those conventionally used for forming the metallized layer.

DETAILED DESCRIPTION OF THE PREFERRED EMBODIMENTS

The mullite powder used as a starting material may be a powder obtained by mixing alumina and silicon oxide, calcining the mixture to form mullite, and pulverizing the mullite. According to the present invention, a sintered mullite-based ceramic body having a desired flexural strength can be obtained from this kind of mullite powder by adding yttrium oxide, but in the prior art, a sintered body obtained from such a calcined mullite powder has a low flexural strength.

A high purity mullite powder obtained by the electrofusion method may be also used in the present invention, and provides a dense sintered body having an even higher flexural strength.

A high purity, fine mullite powder obtained by spraying and pyrolizing intermediate products of alkoxides or salts of aluminum and silicon can be also used in the present invention, although these elements are expensive.

The amount of yttrium oxide added is generally from 0.1 to 20% by weight, preferably from 0.5 to 10% by weight, and more preferably from 0.5 to 3% by weight of the total of the yttrium oxide and the mullite powder, although an optimum amount of the yttrium oxide depends on the particle size, the firing temperature, and the purity, etc., of the mullite powder. For example, when the mullite powder has a particle size of about 1 μm, the amount of yttrium oxide added is preferably from 0.5 to 3% by weight. Generally, it is considered that the larger the particle size of the mullite powder, the larger the amount of the yttrium oxide to be added, although this is not definite in relation to the yield of a good mullite phase.

Since the yttrium oxide is a compound which is classified into the III-a group of the Periodic Table, lanthanum oxide has been investigated as a sintering aid. The effect of the lanthanum oxide on densification of the body was found to be poor. Consequently, the effect of the yttrium oxide is not common to the all compounds of the III-a group.

The partial removal of the organic binder may be conducted conventionally, and is generally conducted by heating the body in an oxidizing atmosphere, such as air or oxygen, at a temperature lower than around 200° C. Then, a residual organic component may be eliminated completely at the temperature range of from 20 to 1000° C. in a neutral wet atmosphere. A conductor material, such as tungsten or molybdenum, which is printed on the surface of the body, can be protected against oxidation under this treatment condition.

According to the present invention, there is provided a sintered mullite-based ceramic body having properties inherent to mullite such as a low thermal expansion coefficient and a low dielectric constant, as well as an improved flexural strength that is superior to that obtained when an alkali earth metal oxide is used as a sintering agent as in the prior art.

Mullite ceramic bodies for electronics parts are generally metallized, and sometimes soldered with outer metal leads in certain uses. The mullite-based ceramic body according to the present invention is particularly suitable for metallization. Further, the soldering of outer leads to the metallized layer of the mullite-based body has a high strength (peel strength) that is approximately twice as high as that obtainable in a mullite ceramic body having magnesium oxide (MgO) added as a sintering agent, as in the prior art. Accordingly, the sintered mullite-based body according to the present invention is, most suitable for use in electronic parts.

The adhesion strength of the metallized layer after the heat treatment was tested by soldering outer leads to the metallized layer and measuring the force necessary to peel the leads from the metallized layer. When measuring the adhesion strength of a metallized layer on a mullite ceramic body that was formed by using MgO as the sintering agent, the strength was approximately 400 g/lead. In contrast, the strength of the metallized layer of a mullite-based body formed by using 2% by weight of yttrium oxide as the sintering agent was about 700 g/lead. Further, the metallized layer of a mullite-based body that was formed by using 5% by weight of yttrium oxide had an adhesion strength comparable to the tensile strength of the outer leads in the test, more than 90% of the outer leads were broken before they could be peeled off.

Thus, in a sintered mullite-based ceramic body according to the present invention, the strengths of the metallized layer and of the soldering are greatly improved.

Among alkali earth metal compounds known as a sintering agent in the prior art, MgO, for example, reacts with a part of the mullite phase to form a cordierite phase as a second phase in the sintering mechanism. The relationship between this formation of the second phase and a surface roughness of a sintered body is not clear, but the addition of MgO as a sintering agent to a mullite powder having a particle size of about 1 μm resulted in a sintered mullite-based body having a surface roughness Ra of about 0.9 μm. In contrast, according to the present invention, a sintered mullite-based body obtained from a mullite powder having the above particle size and $Y_2O_3$ as a sintering agent advantageously had a surface roughness Ra of about 0.5 μm. Thus, the sintered mullite-based ceramic body of the present invention has an excellent surface smoothness.

The sintered mullite-based ceramic body according to the present invention has an excellent light transmittance property when a mullite powder having a particle size of less than 2 μm is used as a starting material. As a result, printed letters 2 mm square can be read through a sintered-mullite-based body having a thickness of about 0.5 mm and placed over the printed letters. Therefore, the sintered mullite-based ceramic body according to the present invention is useful not only as substrates for electronic parts and packaging materials but also as materials required to have a light transmittance property, such as enclosures for an arc tube.

On the other hand, when light-shielding is required, a colorant can be added. In such a case, a colorant that will not damage the inherent properties of mullite must be selected. Among known colorants are $TiO_2$, $Fe_2O_3$, $Cr_2O_3$, etc., for alumina-based ceramic, etc. In experiments, an addition of 1% by weight of $Cr_2O_3$ did not provide a sufficient coloration of a sintered mullite-based body of the present invention. An addition of $Fe_2O_3$ and $TiO_2$ resulted in a deterioration of dielectric property of a sintered mullite body particularly an addition of $TiO_2$ disadvantageously resulted in a remarkable increase in the dielectric constant of the sintered mullite body. In contrast, the addition of $MoO_3$ resulted in a sufficient coloration of a sintered body even at an amount of about 1% by weight. Moreover, by adding $Cr_2O_3$ together with $MoO_3$, an even a smaller added amount of $MoO_3$ gave a sufficient coloration of sintered body and the inherent properties of mullite were not damaged, but the flexural strength of a sintered body was even improved.

It is noted that, in an alumina ceramic body, a total of about 4% by weight of colorants should be added to provide a sufficient light-shielding property to the body. This is one of the reasons why the dielectric constant is increased in an alumina ceramic body. On the other hand, according to the present invention, a small added amount, such as about 1% by weight of $MoO_3$, provides a sufficient light-shielding property to a sintered body. This is one reason for the prevention of an increase of the dielectric constant of a sintered body in the present invention. The addition of $MoO_3$ as a colorant is generally from 0.1 to 2.0% by weight, preferably up to 1% by weight, of the total weight of the mullite powder and yttrium oxide as a starting material. A combination of $MoO_3$ and $Cr_2O_3$ is also preferred. Thus, a colored sintered mullite-based body prepared with $MoO_3$ alone or a mixture of $MoO_3$ and 0.1–1.0 wt. % of $Cr_2O_3$ added thereto is suitable for light shielding ceramic packaging materials.

Furthermore, a thermal expansion coefficient of a sintered mullite-based body according to the present invention can be satisfactorily reduced from the inherent thermal expansion coefficient of mullite by adding an alkali earth metal compound as a 2nd or 3rd additive, preferably MgO.

EXAMPLES

The present invention will be further described below with reference to Examples, which do not restrict the present invention.

Example 1

98 parts by weight of an electrofused mullite powder having an average particle size of about 1 μm was added with 2 parts by weight of yttrium oxide in an n-butanol-toluene mixture as a dispersing medium, and the whole was then mixed in a ball mill for 24 hours. 3 parts by weight of dibutyl phthalate and 8 parts by weight of polyvinylbutylar were added into the mixture, and the mixture was treated again in the ball mill for 24 hours. The resultant dispersion was vacuum-degassed and formed by the doctor blade method into sheets.

The resultant green sheets had a density of 1.92 g/cm³. The green sheets were first heat treated from room temperature to 200° C. in air and up to 1000° C. in a neutral wet atmosphere to remove organic components in the sheets, and then heat treated in a weak reducing atmosphere under the atmospheric pressure at 1560° C. for 4 hours. The resultant sintered sheets had a density of 3.14 g/cm³.

The dielectric constant, flexural strength, and thermal expansion coefficient of the sintered sheets were measured. The dielectric constant was measured at 20° C. and 1 MHz. The flexural strength of the sheets was measured on a sheet having a width of 7 mm and a thickness of 2 mm and a span of 40 mm. The thermal expansion coefficient was measured at a temperature range of from 20° C. to 320° C. The color of a sintered sheet was observed. The results are shown in Table 1.

Example 2

Example 1 was repeated, except that 1 part by weight of $MoO_3$ was added to the starting material of the mullite powder and yttrium oxide.

The resultant green sheets had a density of 1.94 g/cm³, and the sintered sheets had a density of 3.16 g/cm³. The measured characteristics of the sintered sheets are shown in Table 1.

Example 3 (Comparative)

Example 1 was repeated, except that 2 parts by weight of MgO were used instead of yttrium oxide, and were added to 98 parts by weight of an electrofused mullite powder.

The resultant green sheets had a density of 1.92 g/cm³ and the sintered sheets had a density of 3.11 g/cm³. The measured characteristics of the sintered sheets are shown in Table 1.

Example 4 (Comparative)

72 parts by weight of alumina powder having an average particle size of less than 2 μm and 28 parts by weight of silica powder having an average particle size of about 4 μm were ball-milled in a medium of alumina balls continued in a plastic pot for 10 hours, to pulverize and mix the powders. The resultant powders were heat treated in air at 1300° C. for 40 minutes and then ball-milled in a plastic pot with alumina balls for 24 hours. The heat treatment and ball milling processes were then repeated once again to obtain a mullite powder.

Using 98 parts by weight of the obtained mullite powder and 2 parts by weight of MgO, the procedures of Example 1 were repeated.

The obtained green sheets had a density of 1.86 g/cm³ and the sintered sheets had a density of 2.91 g/cm³. The measured characteristics of the sintered sheets are shown in Table 1.

Example 5

The procedures of Example 1 were repeated but 99 parts by weight of a mullite powder having an average particle size of less than 1 μm was added to 1 part by weight of yttrium oxide, the mullite powder being prepared by a sol-gel-method.

The resultant sintered sheets had a density of 3.13 g/cm³. The measured characteristics of the sintered sheets are shown in Table 1.

Example 6 (comparative)

The procedures of Example 1 were repeated. In this Example, 96, 97, and 98 parts by weight of an electrofused mullite powder having an average particle size of about 1 μm were added to 4, 3, and 2 parts by weight of lanthanum oxide ($La_2O_3$), respectively.

The resultant sintered sheets had a density of 3.08 g/cm³ when 4 parts by weight of the lanthanum oxide was added, and densities of less than 3.0 g/cm³ when 3 and 2 parts by weight of the lanthanum oxide were added. The measured characteristics of the sintered sheets are shown in Table 1.

Example 7 (comparative)

Here, 98, 98, and 99 parts by weight of an electrofused mullite powder having an average particle size of about 1 μm (the same powder as in Example 1) were added to 5.36, 3.57, and 1.79 parts by weight, respectively, of calcium carbonate (corresponding to 3, 2, and 1 parts by weight of $CaCO_3$ respectively). Then, sintered sheets were made in accordance with the procedures of Example 1.

The sintered sheets had a density of 2.67 g/cm$^3$ (at 1.79 parts by weight of $CaCO_3$) and 3.06 g/cm$^3$ (at 3.57 parts by weight of $CaCO_3$). The sintered sheets from 5.36 parts by weight of $CaCO_3$ were firmly adhered to a table, and thus the density thereof could not be measured. The measured characteristics of the sintered sheets are shown in Table 1.

Example 8

The procedures of Example 1 were repeated, but 98 parts by weight of an electrofused mullite powder having an average particle size of about 2 μm was added to 1 part by weight of yttrium oxide, ($Y_2O_3$) 0.5 part by weight of molybdenum oxide ($MoO_3$), and 0.5 part by weight of chromium oxide ($Cr_2O_3$).

The resultant sintered sheets had a density of 3.16 g/cm$^3$ and a black brown color. The measured characteristics of the sintered sheets are shown in Table 1.

Example 9

In accordance with the procedures of Example 1, 95, 96, 97, and 98 parts by weight of an electrofused mullite powder were added to 5, 4, 3, and 2 parts by weight of yttrium oxide, respectively, and green sheets were obtained. A tungsten paste was printed onto the green sheets and the green sheets were stacked, cut, and fired to form sintered sheets of a tungsten pad having a size of 2 mm × 6 mm. To this pad, a Kovar wire was brazed and the peeling test was conducted to measure the peeling-off strength and mode.

The peeling-off strength was increased from about 740 g/wire, to about 720 g/wire, to about 780 g/wire, to about 790 g/wire, with an increase of the added amount of yttrium oxide (from 2 to 3, to 4, to 5 parts by weight). The rate of breakage of the Kovar wire without peeling-off was also increased from 64%, to 61%, to 89%, to 94%, with an increase of the added amount of yttrium oxide. Since the tensile strength of the Kovar wire was about 800 g/wire, the above results indicate that the rate of breakage of the leads brazed to the pad with an adhesion strength of more than about 800 g/wire was increased.

TABLE 1

| Example | Starting mullite | Additive | Density (g/cm$^3$) Green | Density (g/cm$^3$) Sintered | Dielectric constant | Flexural strength (kg/mm$^2$) | Thermal expansion coefficient ($\times 10^{-6}$/°C.) | Color |
|---|---|---|---|---|---|---|---|---|
| 1 | Electrofused mullite | $Y_2O_3$ (2 wt %) | 1.92 | 3.14 | 6.4 | 21.2 | 4.2 | White |
| 2 | Electrofused mullite | $Y_2O_3$ (2 wt %) $MoO_3$ (1 wt %) | 1.94 | 3.16 | 6.9 | 24.5 | 4.5 | Black |
| 3* | Electrofused mullite | MgO (2 wt %) | 1.92 | 3.11 | 6.4 | 16.1 | 4.1 | White |
| 4* | $Al_2O_3$ + $SiO_2$ (72.0 wt %/28.0 wt %) | MgO (2 wt %) | 1.86 | 2.91 | 6.6 | 15.6 | 4.9 | White |
| 5 | Sol-gel derived mullite | $Y_2O_3$ (1 wt %) | 1.92 | 3.13 | 7.3 | 31.4 | 4.5 | White |
| 6* | Electrofused mullite | $La_2O_3$ (2 wt %) | 1.92 | 2.69 | — | — | — | White |
|  | Electrofused mullite | $La_2O_3$ (3 wt %) | 1.92 | 2.88 | — | — | — | White |
|  | Electrofused mullite | $La_2O_3$ (4 wt %) | 1.92 | 3.08 | — | 17.3 | — | White |
| 7* | Electrofused mullite | $CaCO_3$ (1.79 wt %) | 1.91 | 2.67 | — | — | — | White |
|  | Electrofused mullite | $CaCO_3$ (3.57 wt %) | 1.91 | 3.08 | — | 14.0 | — | White |
|  | Electrofused mullite | $CaCO_3$ (5.36 wt %) | 1.92 | — | — | — | — | — |
| 8 | Electrofused mullite | $Y_2O_3$ (1 wt %) $MoO_3$ (0.5 wt %) $Cr_2O_3$ (0.5 wt %) | 1.92 | 3.16 | 7.5 | 24.0 | 4.5 | Black |

*Examples, 4, 6 and 7 are comparative.

From Table 1, it can be seen that the sintered mullite based sheets according to the present invention have excellent dielectric constants and thermal expansion coefficients, and have flexural strengths superior to those of the prior art.

We claim:

1. A composition for making a sintered mullite-based ceramics body consisting essentially of:
    80 to 99.9% by weight mullite powder; and
    0.1 to 20% by weight of yttrium oxide.

2. A composition for making a sintered body according to claim 1, wherein said composition consists essentially of 95 to 99.9% by weight of the mullite powder and 0.1 to 5% by weight of yttrium oxide.

3. A composition for making a sintered body according to claim 1, wherein said composition consists essentially of 98 to 99.5% by weight of the mullite powder and 0.5 to 2% by weight of yttrium oxide.

4. A composition for making a sintered body according to claim 1, wherein said composition further consists essentially of 0.1 to 5 parts by weight of at least one alkali earth metal oxides based on 100 parts by weight of the total of the mullite powder and the yttrium oxide.

5. A composition for making a sintered body according to claim 4, wherein said composition further consists essentially of 0.1 to 2 parts by weight of said at least one alkali earth metal oxides.

6. A composition for making a sintered body according to claim 1, wherein said composition further consists essentially of 0.1 to 2 parts by weight of molybdenum oxide based on 100 parts by weight of the total of the mullite powder and the yttrium oxide.

7. A composition for making a sintered body according to claim 6, wherein said composition further consists essentially of chromium oxide.

8. A sintered mullite-based ceramics body manufactured by a process which consists essentially of the steps of:

preparing a composition of 80 to 99.9% by weight of a mullite powder, 0.1 to 20% by weight of yttrium oxide and an organic binder, the total of the mullite powder and the yttrium oxide being 100% by weight;

forming a body from the composition;

first heat treating the body to remove the organic binder from the body; and second heat treating the body at a temperature of 1300° C. to 1850° C. to sinter the body.

* * * * *

UNITED STATES PATENT AND TRADEMARK OFFICE
CERTIFICATE OF CORRECTION

PATENT NO. : 4,935,390

DATED : June 19, 1990

INVENTOR(S) : Michio Moriuchi et al.

It is certified that error appears in the above-identified patent and that said Letters Patent is hereby corrected as shown below:

```
Col. 1, line 33, "thus, so that" should be --silicon.
                  Thus,--;
        line 42, "HOwever" should be --However--.

Col. 6, line 22, "g/cm³and" should be --g/cm³ and--.
```

Signed and Sealed this

Fourteenth Day of May, 1991

Attest:

HARRY F. MANBECK, JR.

*Attesting Officer*                *Commissioner of Patents and Trademarks*